United States Patent
Lee (10) Patent No.: US 10,180,712 B2
(45) Date of Patent: Jan. 15, 2019

(54) APPARATUS AND METHOD FOR LIMITING POWER IN SYMMETRIC MULTIPROCESSING SYSTEM

(71) Applicant: ELECTRONICS AND TELECOMMUNICATIONS RESEARCH INSTITUTE, Daejeon (KR)

(72) Inventor: Byung-Gyu Lee, Sejong-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 63 days.

(21) Appl. No.: 15/380,621

(22) Filed: Dec. 15, 2016

(65) Prior Publication Data

US 2017/0192479 A1    Jul. 6, 2017

(30) Foreign Application Priority Data

Jan. 4, 2016    (KR) .................. 10-2016-0000674

(51) Int. Cl.
*G06F 1/32* (2006.01)
*G06F 1/28* (2006.01)

(52) U.S. Cl.
CPC .............. *G06F 1/3203* (2013.01); *G06F 1/28* (2013.01); *G06F 1/3206* (2013.01)

(58) Field of Classification Search
CPC .................................................. G06F 1/3206
See application file for complete search history.

(56) References Cited

U.S. PATENT DOCUMENTS

| | | | |
|---|---|---|---|
| 2006/0031843 A1* | 2/2006 | Romero ................ | G06F 9/4806 718/104 |
| 2009/0150693 A1 | 6/2009 | Kashyap et al. | |
| 2010/0156178 A1 | 6/2010 | Holmberg | |
| 2011/0016337 A1 | 1/2011 | Cepulis | |
| 2011/0062912 A1 | 3/2011 | Yang et al. | |
| 2011/0239016 A1* | 9/2011 | Boyd ..................... | G06F 1/3203 713/320 |
| 2013/0117592 A1 | 5/2013 | Humphrey et al. | |
| 2013/0163294 A1 | 6/2013 | Jung et al. | |
| 2014/0189694 A1* | 7/2014 | Diefenbaugh ........ | G06F 1/3203 718/102 |
| 2017/0090988 A1* | 3/2017 | Young ................... | G06F 9/5038 |

FOREIGN PATENT DOCUMENTS

| | | |
|---|---|---|
| KR | 10-2010-0071913 | 6/2010 |
| KR | 10-2015-0067806 | 6/2015 |

* cited by examiner

*Primary Examiner* — Albert Wang
(74) *Attorney, Agent, or Firm* — Staas & Halsey LLP (57) ABSTRACT

An apparatus and method for limiting power in a symmetric multiprocessing system. The apparatus for limiting power in a symmetric multiprocessing system includes a power management unit for limiting power consumption of a system to correspond to a power limit value and a power-limiting mode, a QoS profile management unit for managing a QoS profile for each load, which is created using a resource utilization rate and a preset QoS value of the load, and a control unit for assigning the load to a core processor to correspond to the QoS profile for the load if the power-limiting mode is a smart power-limiting mode and if the power consumption is greater than the power limit value.

20 Claims, 7 Drawing Sheets

APPARATUS AND METHOD FOR LIMITING POWER IN SYMMETRIC MULTIPROCESSING SYSTEM

CROSS REFERENCE TO RELATED APPLICATION

This application claims the benefit of Korean Patent Application No. 10-2016-0000674, filed Jan. 4, 2016, which is hereby incorporated by reference in its entirety into this application.

BACKGROUND OF THE INVENTION

1. Technical Field

The present invention relates generally to power limiting and, more particularly, to technology for limiting the power used by each multi-core processor in a symmetric multiprocessing system in consideration of energy efficiency and QoS.

2. Description of the Related Art

Power capping is technology for limiting the power actually consumed by a system to a power limit value (a power cap value), which is set by a user or an administrator.

Such power capping is mainly used for servers in an Internet Data Center (IDC), in which a large amount of power is used, and may be applied in order to limit the maximum power consumption so as not to exceed the amount of power that can be supplied by a power supply device when all of the servers consume the maximum power at the same time. Power capping may also be applied when the power required by a server is not sufficiently supplied due to failure of power supply hardware or the like.

Meanwhile, power capping may be implemented by two methods, namely, one method in which a power supply unit mounted on a computing system limits the total power consumption, and another method in which the power used by various devices in a computing system, such as a CPU, memory, an input/output device, and the like, is limited. Particularly, a technique for limiting the power used by a CPU, which consumes the greatest amount of power in the computing system, is applied most often.

Basically, power capping is configured such that the total power consumption of a system is measured and compared with a power usage value (a power cap value) set by a user. If the total power consumption is greater than the power cap value, the power consumption of the entire system or of components, the power consumption of which can be regulated, is limited.

However, according to this conventional power capping method, when the function of limiting power is performed, power consumption is reduced, thus causing a decrease in performance. Also, the performance decrease may lead to a delay in processing concurrent tasks. That is, because the conventional power capping methods do not consider the increase in processing time that results from the performance decrease when power is limited, additional energy consumption may result.

Also, in the case of a Symmetric Multiprocessing (SMP) system, which is a high-performance system having multiple CPUs, the conventional power-limiting method sets a constant power cap value regardless of the number of CPUs. If the power cap value is set without regard to the number of CPUs in the SMP system, when the CPU utilization rate of only some of the multiple cores is high, energy efficiency may decrease. Also, when various kinds of loads are processed by the system and each of the loads requires a different level of Quality of Service (QoS), the desired QoS may not be provided.

Therefore, new power capping technology that may maximize energy efficiency and provide desired QoS in an SMP system is required.

In connection with this, Korean Patent Application Publication No. 10-2010-0071913, discloses a technology related to "Method and arrangement for limiting electric power required by electric loads."

SUMMARY OF THE INVENTION

An object of the present invention is to provide an energy-efficient power-limiting method in a symmetric multiprocessing system.

Another object of the present invention is to solve the decrease of QoS, which is the limitation of the conventional power capping method, by limiting power for each multi-core processor.

A further object of the present invention is to optimize power saving performance of a symmetric multiprocessing system and to improve energy efficiency.

In order to accomplish the above object, an apparatus for limiting power in a symmetric multiprocessing system according to the present invention includes a power management unit for limiting a power consumption of a system to correspond to a power limit value and a power-limiting mode; a QoS profile management unit for managing a QoS profile for each load, which is created using a resource utilization rate and a preset QoS value of the load; and a control unit for assigning the load to a core processor to correspond to the QoS profile for the load if the power-limiting mode is a smart power-limiting mode and if the power consumption is greater than the power limit value.

The control unit may select a power-limited multi-core processor, power of which is to be limited, from among a plurality of multi-core processors.

The control unit may assign the load, the preset QoS value of which is less than a threshold, to the core processor of the power-limited multi-core processor.

The control unit may assign the load, the preset QoS value of which is equal to or greater than the threshold, to a core processor of the multi-core processor that is not selected as the power-limited multi-core processor.

The control unit may select the core processor to which the load is to be assigned from among one or more core processors included in the power-limited multi-core processor in consideration of the resource utilization rate of the load.

The symmetric multiprocessing system includes a plurality of multi-core processors, and each of the multi-core processors includes one or more core processors, and if the multi-core processor is the power-limited multi-core processor, the one or more core processors included in the multi-core processor may be allocated to the load, the preset QoS value of which is less than the threshold, by the control unit.

If the power-limiting mode is a general power-limiting mode and if the power consumption is greater than the power limit value, the power management unit may control power consumption of the system so as to be equal to or less than the power limit value.

The power management unit may limit a total amount of power supplied to the system, or limit power used by at least one device selected from among a CPU, memory, and an input/output device, which are connected to the system.

The power management unit may periodically compare measured power consumption of the system with the power limit value.

If the power limit value is changed by receiving a change of the power limit value from a user, the power management unit may remeasure power consumption of the system and compare the remeasured power consumption with the changed power limit value.

Also, a method for limiting power, performed by an apparatus for limiting power in a symmetric multiprocessing system according to an embodiment of the present invention includes comparing a measured power consumption with a predetermined power limit value; sorting one or more loads using a QoS profile for each load if a power-limiting mode is a smart power-limiting mode and if the power consumption is greater than the power limit value; and assigning each of the loads to a core processor to correspond to the QoS profile for the load.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated in order to make the description clearer.

Hereinafter, a preferred embodiment of the present invention will be described in detail with reference to the accompanying drawings.

Figure 1:
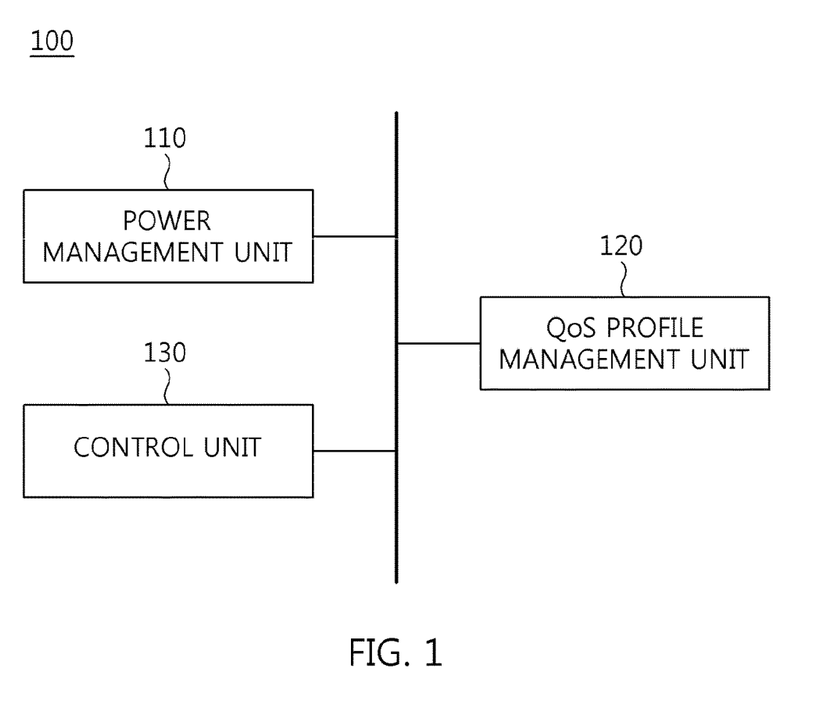
FIG. 1 is a block diagram illustrating the configuration of an apparatus for limiting power according to an embodiment of the present invention.

FIG. 1 is a block diagram illustrating the configuration of an apparatus for limiting power according to an embodiment of the present invention.

As illustrated in FIG. 1, the power-limiting apparatus 100 includes a power management unit 110, a QoS profile management unit 120, and a control unit 130.

First, the power management unit 110 limits the power consumption of a system so as to correspond to a power limit value and a power-limiting mode.

Here, the power limit value may be set by a user, or may be a predetermined value. Also, the power-limiting mode may be a general power-limiting mode, to which conventional power capping technology is applied, or a smart power-limiting mode, in which a respective power limit value is set for each multi-core processor.

If the power consumption of the system is greater than the power limit value and if the power-limiting mode is the general power-limiting mode, the power management unit 110 controls the power consumption of the system so as to be equal to or less than the power limit value. Here, the power management unit 110 may limit the total amount of power supplied to the system, or may limit the power used by at least one device selected from among a CPU, memory, and input/output devices connected to the system.

Meanwhile, if the power consumption of the system is greater than the power limit value and if the power-limiting mode is the smart power-limiting mode, the power management unit 110 limits the power consumption of the system in consideration of the power for a core processor, which is allocated to each load by the control unit 130.

Also, when the power limit value is changed by receiving a changed value from a user, the power management unit 110 compares the changed power limit value with the remeasured power consumption of the system. Then, the power management unit 110 determines whether to limit power using the result of the comparison.

Next, the QoS profile management unit 120 configures a QoS profile for each load using the resource utilization rate of the load and the QoS value preset for the load and manages the configured QoS profile. Here, the QoS profile is created using information about the load and a QoS value preset for the load, and the preset QoS value may be set by a user.

Meanwhile, if the power consumption is greater than the power limit value and if the power-limiting mode is the smart power-limiting mode, the control unit 130 allocates a core processor to each load to correspond to the QoS profile of the load. The control unit 130 may limit the total amount of power of the system by assigning each load to a core processor using the QoS profile of the load.

Also, the control unit 130 may select a power-limited multi-core processor, the power of which is to be limited, from among a plurality of multi-core processors, and may assign a load, the preset QoS value of which is less than a threshold, to a core processor of the power-limited multi-core processor. Here, the control unit 130 may select the core processor, to which the load is to be assigned, from among one or more core processors included in the power-limited multi-core processor in consideration of the resource utilization rate of the load.

Also, the control unit 130 may assign a load, the preset QoS value of which is equal to or greater than the threshold, to a general multi-core processor, which is not selected as the power-limited multi-core processor.

For the convenience of description, the control unit 130 is described as selecting a multi-core processor to which a load is to be assigned from among a power-limited multi-core processor and a general multi-core processor by comparing the preset QoS value of the corresponding load with a threshold. However, without limitation to this, the preset QoS values of loads may be classified so as to correspond to the number of multi-core processors included in the symmetric multiprocessing (SMP) system, and the loads may be assigned to each of the multi-core processors.

Hereinafter, a power-limiting method of a power-limiting apparatus in a symmetric multiprocessing system according to an embodiment of the present invention will be described in detail with reference to FIGS. 2 to 7.

Figure 2:
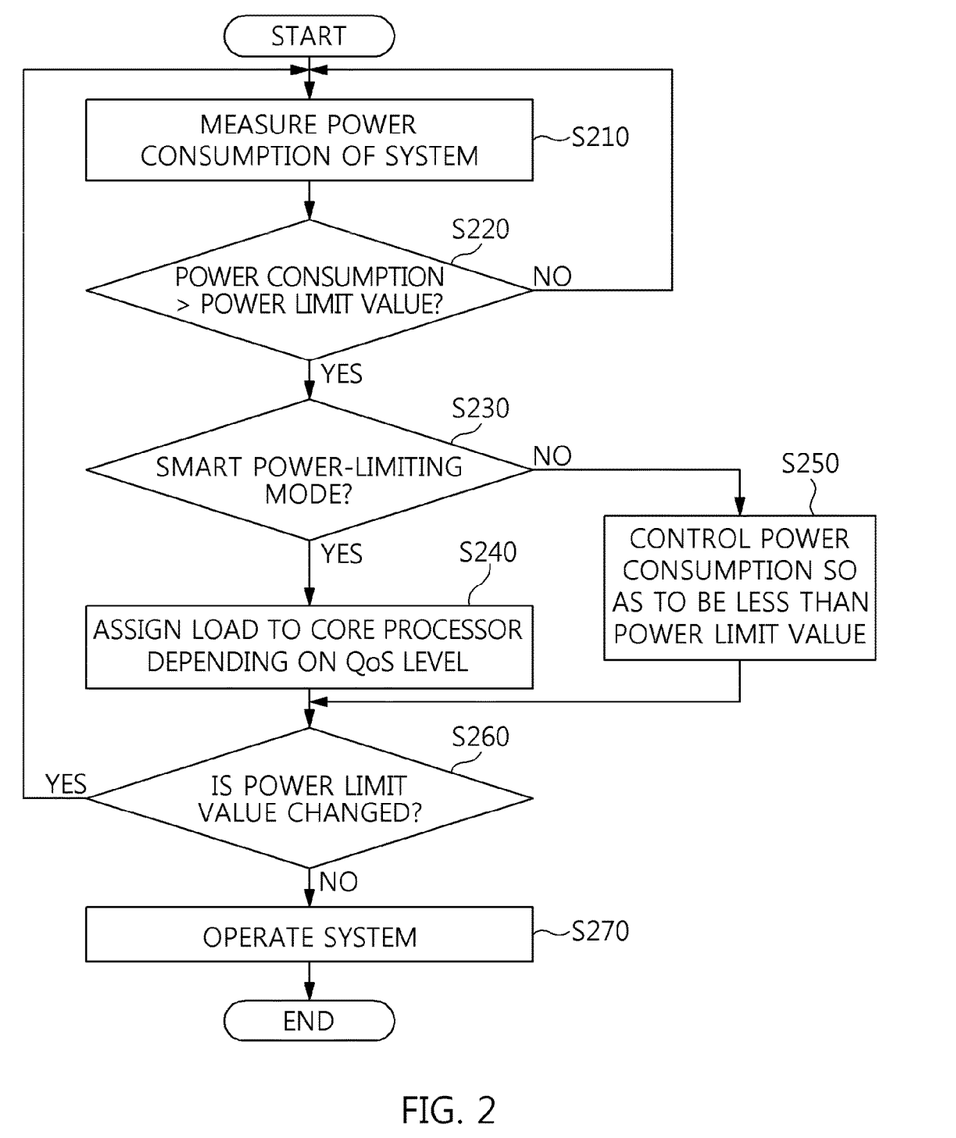
FIG. 2 is a flowchart illustrating a method for limiting power in a symmetric multiprocessing system according to an embodiment of the present invention.

FIG. 2 is a flowchart illustrating a method for limiting power in a symmetric multiprocessing system according to an embodiment of the present invention.

First, the power-limiting apparatus 100 measures the power consumption of the symmetric multiprocessing system at step S210.

Here, the power consumption is information about the power measured inside or outside the system, and the symmetric multiprocessing (SMP) system means a multiprocessor computer architecture in which two or more processors use a single shared memory.

Figure 3:
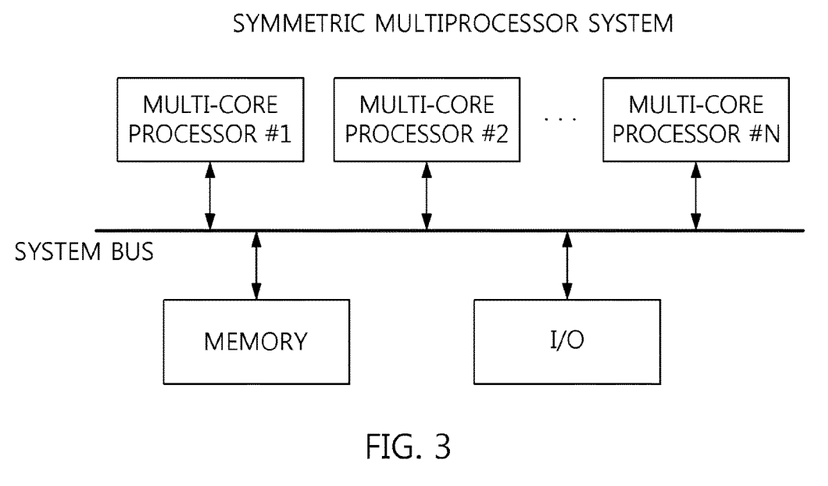
FIG. 3 is a view illustrating the configuration of a symmetric multiprocessing system.

FIG. 3 is a view illustrating the configuration of an SMP system.

As shown in FIG. 3, in the SMP system, a plurality of homogeneous multi-core processors is installed in a single system. The multiple multi-core processors share a single main memory, an input/output device, and a system bus, and a single operating system (OS) manages all of the processors.

Such an SMP system facilitates parallel programming comparable to Massively Parallel Processing (MPP), and also facilitates balance of the workload between processors. Also, the SMP system may effectively be used for online transaction processing (OLTP), in which a lot of concurrent users access the same database to process data.

Next, the power-limiting apparatus 100 compares the measured power consumption with a power limit value at step S220.

The power limit value may be set by a user, or may be a value predetermined in the system. The power-limiting apparatus 100 may change the power limit value by receiving it from the user.

The power-limiting apparatus 100 determines whether to apply power capping technology to the SMP system by comparing the power consumption with the power limit value. Here, if the power consumption is greater than the power limit value, the power-limiting apparatus 100 may set the power-limiting mode of the SMP system to either a general power-limiting mode or a smart power-limiting mode, and then apply the power capping technology.

If the power consumption is found to be equal to or less than the power limit value as the result of the comparison, the power-limiting apparatus 100 may not apply the power capping technology to the SMP system. Also, the power-limiting apparatus 100 may periodically measure the power consumption of the system by performing step S210.

Conversely, if the power consumption is greater than the power limit value, it is determined at step S230 whether or not the power-limiting mode is a smart power-limiting mode.

Here, the power-limiting apparatus 100 may determine whether or not the power-limiting mode is a smart power-limiting mode, using the predetermined power-limiting mode of the SMP system or using a power-limiting mode input from a user.

If the SMP system is set to the smart power-limiting mode, the power-limiting apparatus 100 assigns each load to a core processor depending on the level of QoS at step S240.

Figure 4:
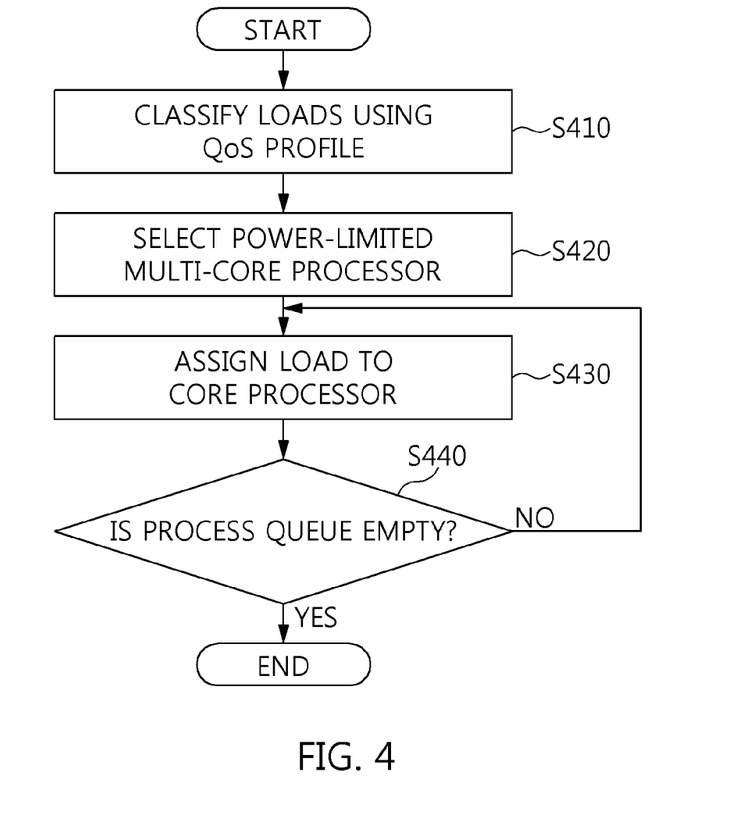
FIG. 4 is a flowchart illustrating a method for limiting power in a smart power-limiting mode according to an embodiment of the present invention.

FIG. 4 is a flowchart illustrating a method for limiting power in a smart power-limiting mode according to an embodiment of the present invention.

As illustrated in FIG. 4, the power-limiting apparatus 100 classifies loads using a QoS profile at step S410.

Figure 5:
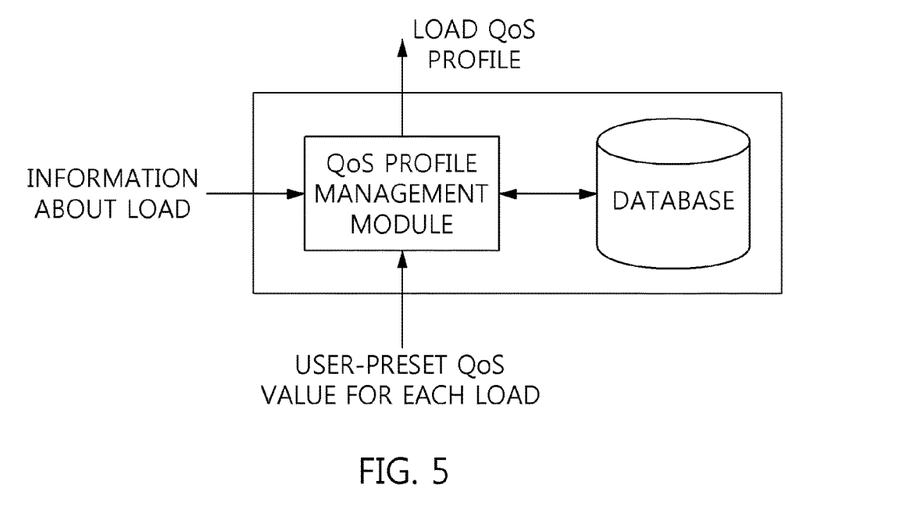
FIG. 5 is a view explaining the creation of a QoS profile according to an embodiment of the present invention.

FIG. 5 is a view explaining the creation of a QoS profile according to an embodiment of the present invention.

As shown in FIG. 5, the power-limiting apparatus 100 creates a load QoS profile for each load using information about the load and a QoS value preset for the load, which is set by a user. Then, loads are classified and sorted depending on the level of QoS using the created QoS profile.

Subsequently, the power-limiting apparatus 100 selects a power-limited multi-core processor at step S420.

In order for the power used by the SMP system not to exceed the power limit value, the power-limiting apparatus 100 may set the power limit value of the power-limited multi-core processor. Here, the power-limiting apparatus 100 may set the power limit value of the power-limited multi-core processor to correspond to the number of multi-core processors or the number of power-limited multi-core processors.

Figure 6:
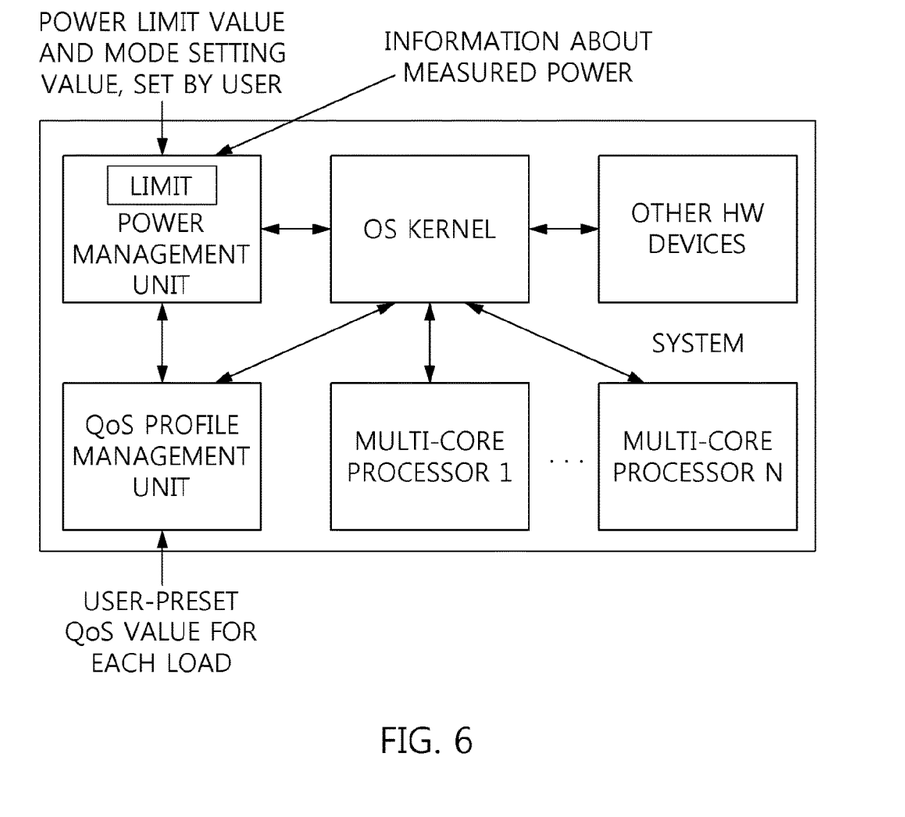
FIG. 6 is a view illustrating the configuration of an apparatus for limiting power in a symmetric multiprocessing system according to an embodiment of the present invention.
Figure 7:
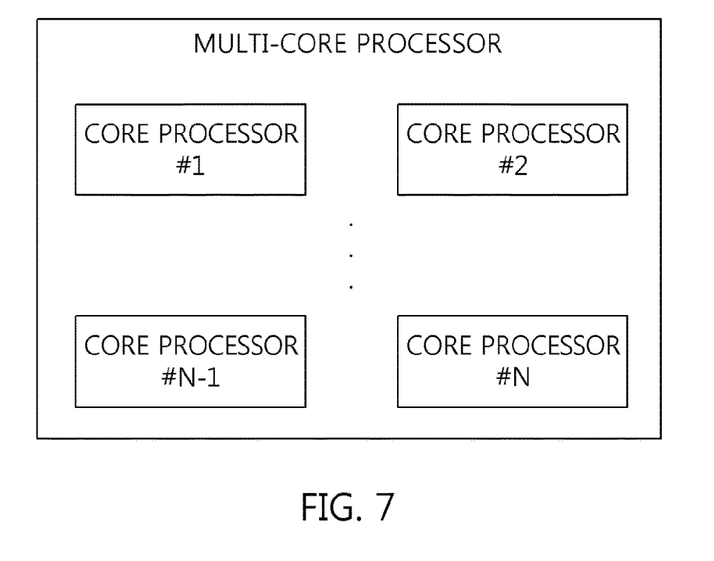
FIG. 7 is a view illustrating the configuration of a multi-core processor.

FIG. 6 is a view illustrating the configuration of a power-limiting apparatus in an SMP system according to an embodiment of the present invention, and FIG. 7 is a view illustrating the configuration of a multi-core processor.

As illustrated in FIG. 6, the power management unit of the power-limiting apparatus 100 may assign a load to a core processor using a QoS profile for each load, created by the QoS profile management unit. Here, the power management unit may apply power capping technology to the multiple multi-core processors of the SMP system through the OS kernel, and the OS kernel may communicate not only with the power management unit but also with the multiple multi-core processors, the QoS profile management unit, other hardware devices, and the like.

Also, as shown in FIG. 7, the multi-core processor is a central processing unit (CPU) that comprises multiple core processors. Also, the SMP system comprises a plurality of multi-core processors that may operate in a smart power-limiting mode.

Next, the power-limiting apparatus 100 assigns a load to a core processor at step S430.

The power-limiting apparatus 100 pins a load to a core processor by assigning the load to the core processor, whereby the core processor for processing the corresponding load is selected from among the multiple core processors in the multi-core processor.

For example, it is assumed that an SMP system has two multi-core processors MP, and that each of the multi-core processors includes two core processors P. Here, the first multi-core processor $MP_1$ includes core processors $P_{11}$ and $P_{12}$, and the second multi-core processor $MP_2$ includes core processors $P_{21}$ and $P_{22}$. Also, it is assumed that a process queue Q contains loads, wherein each of the loads ($J_n(X, Y)$) has a resource utilization rate (X, max=10) and a preset QoS value (Y, Y=y|n).

In this case, because there are two multi-core processors, the power of which can be limited, the preset QoS value may be classified into two kinds, that is, y and n. Here, y represents a load, the power of which cannot be limited because a high level of QoS must be assured in real time for the load. Conversely, n represents a load, the power of which can be limited because the required level of QoS is low.

Also, the multiple loads contained in the process queue Q may be sorted by being classified using the preset QoS value. For example, the process queue Q may include loads as follows, Q={$J_1(7, y)$, $J_2(4, y)$, $J_3(3, y)$, ..., $J_8(6, n)$, $J_9(5, n)$, $J_{10}(2, n)$, ...}.

The power-limiting apparatus 100 pins the multiple loads, included in the process queue Q, to each of the core processors P.

Then, the power-limiting apparatus 100 checks whether the process queue is empty at step S440.

The empty process queue means that there is no load to be assigned to a core processor. Conversely, if there is a load in the process queue, the power-limiting apparatus 100 may assign the load in the process queue to a core processor through step S430.

As the result of assignment, the loads may be assigned to each of the core processors P as follows: $P_{11}$={$J_1(7, y)$, ...}, $P_{12}$={$J_2(4, y)$, $J_3(3, y)$, ...}, $P_{21}$={$J_8(6, n)$, ...}, $P_{22}$={$J_9(5, n)$, $J_{10}(2, n)$, ...}.

For the convenience of description, an example in which the power-limiting apparatus 100 classifies multiple loads depending on the preset QoS value, sorts the loads in descending order of resource utilization rate, and assigns the loads to core processors is described. However, without limitation to this example, the power-limiting apparatus 100 may classify and sort the loads through various methods using information about the loads and QoS in order to assign the loads to core processors.

Also, when the power-limiting mode is set to a general power-limiting mode, the power-limiting apparatus 100 controls the power consumption so as to be equal to or less than the power limit value at step S250.

Here, the power-limiting apparatus 100 limits the total power used by the power supply unit installed in the SMP system, or limits the power used by the CPU, memory, input/output device, and the like of the SMP system, whereby the power consumption may be controlled to be equal to or less than the power limit value.

Then, the power-limiting apparatus 100 may determine at step S260 whether the power limit value is changed. If the power limit value is changed, the power consumption is measured again by performing step S210 and is compared with the changed power limit value in order to determine whether to apply power capping technology.

For the convenience of description, step S210 is described as being performed when the power limit value is changed. However, without limitation to this, the power-limiting apparatus 100 may perform step S220, and thereby may compare the previously measured power consumption with the power limit value, which was determined at step S260 as having changed.

Also, when it is determined at step S260 that the power limit value has not changed, the power-limiting apparatus 100 may make the system operate in the smart power-limiting mode or the general power-limiting mode at step S270.

The power-limiting apparatus 100 make the system operate while limiting the total power consumption of the system through step S240 or S250.

As described above, by using the apparatus and method for limiting power in a symmetric multiprocessing system according to an embodiment of the present invention, power may effectively be limited in the SMP system, which has not been targeted by conventional power limiting technology. Also, because power limits are respectively set for multiple multi-core processors, a decrease in QoS, which is a limitation of the conventional power-limiting method, may be solved.

According to the present invention, it is possible to provide an energy-efficient power-limiting method in a symmetric multiprocessing system.

Also, the present invention may solve the decrease of QoS, which is the limitation of a conventional power capping method, by separately limiting the power for each multi-core processor.

Also, the present invention may optimize the energy saving performance of a symmetric multiprocessing system and improve energy efficiency.

As described above, the apparatus and method for limiting power in a symmetric multiprocessing system according to the present invention are not limitedly applied to the configurations and operations of the above-described embodiments, but all or some of the embodiments may be selectively combined and configured so that the embodiments may be modified in various ways.

What is claimed is:

1. An apparatus to limit power consumption in a symmetric multiprocessing system including a plurality of multi-core processors, comprising:
   at least one processor to:
     determine whether a power consumption of the symmetric multiprocessing system is greater than a power limit value;
     when the at least one processor determines that the power consumption is greater than the power limit value,
       assign at least one load to the plurality of multi-core processors using a Quality of Service (QoS) profile to limit a power consumption of the plurality of multi-core processors to which the at least one load is assigned,
       the at least one load having a resource utilization rate and a QoS value indicative of a required level of QoS corresponding to the at least one load, and the QoS profile being settable according to the resource utilization rate of the at least one load and the QoS value of the at least one load; and limit the power supplied to the plurality of multi-core processors that the at least one load is assigned to based on the QoS profile.

2. The apparatus of claim 1, wherein the at least one processor selects a power-limited multi-core processor, power of which is to be limited based on the QoS value of the at least one load, from among the plurality of multi-core processors.

3. The apparatus of claim 2, wherein the at least one load includes a first load, and when the at least one processor determines that the QoS value of the first load is less than a threshold value, the at least one processor assigns the first load to the selected power-limited multi-core processor.

4. The apparatus of claim 3, wherein when the at least one processor determines that the QoS value of the first load is equal to or greater than the threshold value, the at least one processor assigns the first load to one of the plurality of multi-core processors that is not selected as the power-limited multi-core processor.

5. The apparatus of claim 3, wherein each of the plurality of multi-core processors includes one or more core processors, and a core processor of the selected power-limited multi-core processor to which the first load is assigned is selected according to the resource utilization rate of the first load.

6. The apparatus of claim 2, wherein the plurality of multi-core processors includes one or more core processors, the at least one load includes a first load and when at least one processor determines that the QoS value of the at least one load is less than a threshold value, one or more core processors included in the selected multi-core processor are allocated to the first load.

7. The apparatus of claim 1, wherein the at least one processor limits the power consumption of the symmetric multiprocessing system according to a power-limiting mode,
wherein, the power-limiting mode includes a first power-limiting mode which the QoS value is used to limit the power consumption and a second power-limiting mode which the QoS value is not used to limit the power consumption, and
wherein when the power-limiting mode is the second power-limiting mode and the at least one processor determines that the power consumption is greater than the power limit value, the at least one processor changes the power consumption of the symmetric multiprocessing system to be equal to or less than the power limit value.

8. The apparatus of claim 7, wherein when the power-limiting mode is the second power-limiting mode, a total amount of power supplied to the symmetric multiprocessing system is limited, or power used by at least one device selected from among a Central Processing Unit (CPU), memory, and an input/output device, which are connected to the symmetric multiprocessing system, is limited.

9. The apparatus of claim 1, wherein the at least one processor periodically measures a current power consumption of the symmetric multiprocessing system and compares the measured current power consumption with the power limit value.

10. The apparatus of claim 1, wherein when the at least one processor determines that the power limit value is changed, the at least one processor re-measures the power consumption of the symmetric multiprocessing system and compares the re-measured power consumption with the changed power limit value.

11. A method for limiting power, performed by an apparatus for limiting power consumption in a symmetric multiprocessing system including a plurality of multi-core processors, comprising:
by at least one processor:
determining whether a power consumption of the symmetric multiprocessing system is greater than a power limit value;
sorting at least one load using a Quality of Service (QoS) value of the at least one load, the QoS value indicative of a required level of QoS corresponding to the at least one load in response to determining that the power consumption is greater than the power limit value; and
assigning the at least one load to the plurality of core processors using a QoS profile to limit a power consumption of the plurality of multi-core processors to which the at least one load is assigned, the at least one load having a resource utilization rate and the QoS value, and the QoS Profile being settable according to the resource utilization rate of the at least one load and the QoS value of the at least one load; and
limiting the power supplied to the plurality of multi-core processors that the at least one load is assigned to based on the QoS profile.

12. The method of claim 11, wherein the plurality of core processors is a plurality of multi-core processors and the method further comprising selecting a power-limited multi-core processor, power of which is to be limited, from among the plurality of multi-core processors.

13. The method of claim 12, wherein:
the QoS profile of the load includes a resource utilization rate and a QoS value of the load; and
the assigning of the at least one load further comprises assigning the at least one load to the selected power-limited multi-core processor when the QoS value of the at least one load is less than a threshold value.

14. The method of claim 13, wherein the assigning of the at least one load further comprises, assigning the at least one load to the plurality of multi-core processors that is not selected as the power-limited multi-core processor when the QoS value of which is equal to or greater than the threshold value.

15. The method of claim 13, wherein the power-limited multi-core processor is selected according to the resource utilization rate of the at least one load.

16. The method of claim 12, wherein each of the plurality of multi-core processors includes one or more core processors, and when one of the plurality of multi-core processors is the selected as the power-limited multi-core processor, the one or more core processors included in the selected multi-core processor are allocated to the at least one load, the QoS value of the at least one load is less than the threshold.

17. The method of claim 11, wherein the method further comprising limiting the power consumption of the symmetric multiprocessing system according to a power-limiting mode,
wherein the power-limiting mode includes a first power-limiting mode which the QoS profile is used to limit the power consumption and a second power-limiting mode which the QoS profile is not used to limit the power consumption, and the method further comprising when the power-limiting mode the second power-limiting mode and the power consumption is greater than the power limit value, changing the power consumption of the symmetric multiprocessing system so as to be equal to or less than the power limit value.

18. The method of claim 17, wherein the changing of power consumption of the symmetric multiprocessing system comprising when the power-limiting mode is the second power-limiting mode, limiting a total amount of power supplied to the symmetric multiprocessing system, or limiting power used by at least one device selected from among a CPU, memory, and an input/output device, which are connected to the symmetric multiprocessing system.

19. The method of claim 11, wherein the determining further comprises periodically measuring a current power consumption of the symmetric multiprocessing system and comparing the measured current power consumption of the symmetric multiprocessing system with the power limit value.

20. The method of claim 11,
further comprising: receiving a change of the power limit value;
in response to the receiving of the change of the power limit value, re-measuring the power consumption of the symmetric multiprocessing system is re-measured, and comparing the re-measured power consumption with the changed power limit value.

* * * * *